(12) United States Patent
Marshall

(10) Patent No.: US 8,718,623 B2
(45) Date of Patent: *May 6, 2014

(54) MEASURING END USER ACTIVITY OF SOFTWARE ON A MOBILE OR DISCONNECTED DEVICE

(71) Applicant: Nuance Communications, Inc., Burlington, MA (US)

(72) Inventor: Kevin B. Marshall, Kirkland, WA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,427

(22) Filed: Jul. 15, 2013

(65) Prior Publication Data

US 2013/0303111 A1 Nov. 14, 2013

Related U.S. Application Data

(63) Continuation of application No. 12/366,572, filed on Feb. 5, 2009, now Pat. No. 8,489,081.

(60) Provisional application No. 61/026,413, filed on Feb. 5, 2008.

(51) Int. Cl.
*H04M 3/42* (2006.01)

(52) U.S. Cl.
USPC .............. 455/414.4; 455/412.1; 455/412.2; 455/414.1; 455/404.1; 455/456.1

(58) Field of Classification Search
USPC ...................................... 455/404.2
See application file for complete search history.

(56) References Cited

PUBLICATIONS

Brandt et al., "txt 4 l8r: Lower the Burden for Diary Studies Under Mobile Conditions," CHI: ACM Conference on Human Factors in Computing Systems, Apr. 28-May 3, 2007, San Jose, California, 7 pages.
Fross, O., "Newton OS 1.x Easter Eggs," <http://oof.org/newton/1page.html>, internet accessed on Sep. 12, 2007, 4 pages.
Gajic, Z., "Delphi Programming: Add an Easter Egg to your Delphi application," <http://delphi.about.com/od/humorandfun/a/delphieasteregg.htm?p=1>, internet accessed on Feb. 3, 2010, 3 pages.
Hilbert, D., "A Survey of Computer-Aided Techniques for Extracting Usability Information from User Interface Events," <http://ftp.ics.uci.edu/pub/eden/papers/reports/1998/ics9813.pdf>, 1998, 23 pages.
Ryan, L., "Software usage metrics for real-world software testing," IEEE Spectrum, vol. 35, Issue 4, Apr. 1998, 5 pages.
Stanford HCI Group, "4l8r: Lowering the Burden for Diary Studies Under Mobile Conditions," project summary, <http://hci.stanford.edu/4l8r/>, internet accessed on Sep. 12, 2007, 2 pages.
Wikipedia.org, "HP 200Lx," <http://en.wikipedia.org/wiki/HO_2001x>, internet accessed on Sep. 12, 2007, 6 pages.

*Primary Examiner* — Olumide T Ajibade Akonai
*Assistant Examiner* — Randy Peaches
(74) *Attorney, Agent, or Firm* — Perkins Coie LLP

(57) ABSTRACT

A hardware and/or software facility measures end user activity associated with a software application or service on a mobile phone or other mobile device. The facility tracks and stores usage data associated with a mobile user's use of the application or service. When the mobile user initiates transmission of the usage data, the facility retrieves from the mobile phone or other mobile device a usage code representing the usage data. The facility relies on user transcription, text input-buffer insertion, or other indirect means of data transport to deliver the usage code from the mobile phone or other mobile device to an application developer, service provider, or another entity. The recipient extracts the usage data contained in the usage code, and may perform various data mining and analysis techniques on the usage data in order to evaluate how the application or service is used.

19 Claims, 4 Drawing Sheets

MEASURING END USER ACTIVITY OF SOFTWARE ON A MOBILE OR DISCONNECTED DEVICE

CROSS-REFERENCE TO RELATED APPLICATION(S)

This application is a continuation of U.S. patent application Ser. No. 12/366,572 entitled "MEASURING END USER ACTIVITY OF SOFTWARE ON A MOBILE OR DISCONNECTED DEVICE," filed Feb. 5, 2009, which claims the benefit of U.S. Provisional Application No. 61/026,413 entitled "MEASURING END USER ACTIVITY OF SOFTWARE ON A MOBILE OR DISCONNECTED DEVICE," filed Feb. 5, 2008.

BACKGROUND

Applications and services of all types often undergo usability testing prior to release and in some cases after the release of the application or service. Usability testing measures the usability and/or utility of a system or device. For example, a usability test may measure data points that indicate how easy an application is to use, how often a user makes mistakes, and how well the application works for its intended purpose, among other things. Developers of an application or service may engage in usability testing in order to improve the design of the application or service.

Once an application is installed or a service is deployed for use on a device, usability data associated with the application may be delivered to the application developer, service provider, or another entity. For example, a software product on a desktop computer may track and store a record of user activity associated with the software, such as how often the software is loaded, whether certain software features are discovered, how often a user selects "cancel," how many documents are edited, and other user activities. Periodically, the software may contact a server of the software product manufacturer and deliver the usability data. The delivered usability data may be analyzed by the manufacturer, and the software product may be further refined.

Delivery of such usability data after an application is installed or a service is deployed is well suited for desktop computers, which generally have abundant network connectivity and storage, and which utilize standardized communications protocols and software libraries. However, portable applications and services developed for mobile phones and other mobile devices may be abstracted from the device platform and may not have access to the network capabilities of the phone. Accordingly, although usability testing of an application or service may be made prior to release of the application or service, once installed or deployed on mobile phones or other mobile devices, the developer of the application or service may have limited or no means to receive usability data. Delivery of usability data and other application or service data may be feasible only for features that are native to the mobile device platform. Delivery of such data is generally unavailable for platform-independent applications and services.

DETAILED DESCRIPTION

A hardware and/or software facility for measuring end user activity associated with a software application or service on a mobile phone or other mobile device is described. The facility tracks and stores data associated with a mobile device user's use of the application or service, and relies on user transcription, text input-buffer insertion, or other indirect means of data transport as a means for delivering the data to the application developer, service provider, or another entity.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
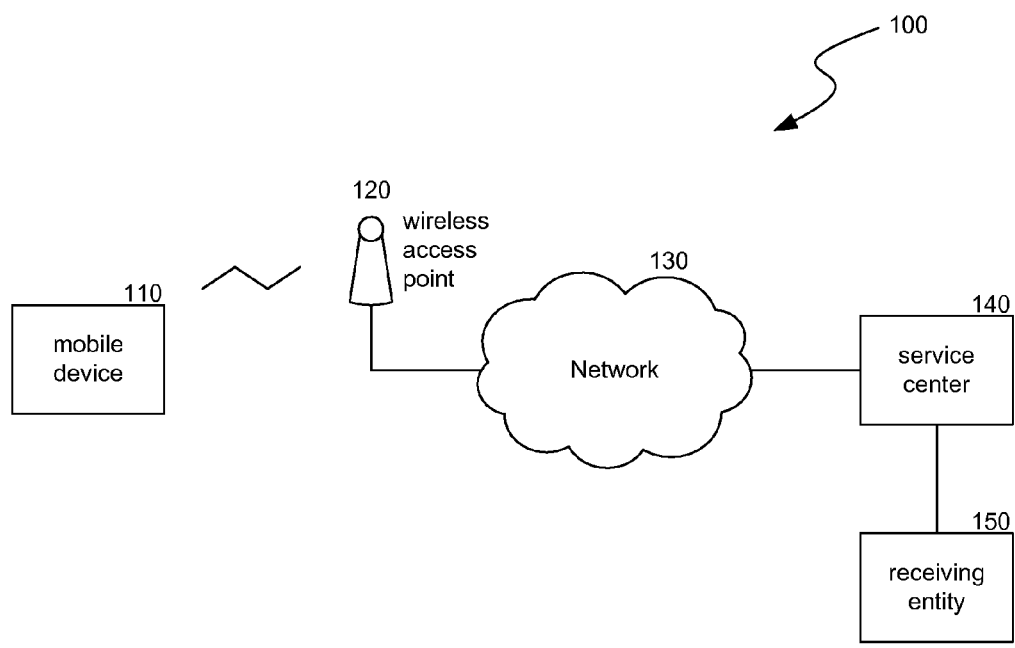
FIG. 1 is a block diagram of an environment in which a facility for measuring end user activity operates.

FIG. 1 depicts a representative environment in which the facility operates. A mobile phone or other mobile device 110 is connected to a network 130 via a wireless access point 120. The facility operates on the mobile device to gather usability data associated with an application. At least once after an application on the device has been used by a user, a usage code reflective of usability data associated with the application is generated by the facility. A user of the mobile device 110 makes use of this code by entering a specialized keystroke within an SMS composition dialog window, which causes the facility to insert the usage code in the body of the SMS message. The SMS message containing the usage code is transmitted to the phone number of the service center 140 via the network 130. The service center 140 forwards the SMS messages received from the user to a receiving entity 150, such as an application developer, service provider, or another entity. The usage code is extracted from the body of the SMS message, decoded, and analyzed by the receiving entity 150.

Those skilled in the art will appreciate that various applications may operate on the mobile device 110. For example, the ease and speed with which users can enter text or compose SMS messages is enhanced by predictive text technologies, such as the T9® (i.e., "text on nine keys") software application from Nuance Communications, Inc. T9 software allows words to be entered with a single key press for each letter in the word. For example, if "a," "b," and "c" are assigned to key 2; "m," "n," and "o," are assigned to key 6; and "t," "u," and "v" are assigned to key 8, a user would press keys 2, 6, 2, and 8 each a single time to enter the word "boat." T9 maps the key sequence entered by a user to a dictionary and selects words that match the key sequence. T9 may offer the user the most commonly used word for the entered key sequence and let the user access other word choices by pressing the "next" key or otherwise indicating that the user desires to see additional word choices. T9 is used as an input method editor (IME) library by mobile phone manufacturers. The IME interface for T9 is limited; T9 receives keystrokes as input and returns text as output. Although many embodiments of the facility may be described in the context of designing for the interface limitations of T9 software, one skilled in the art will appreciate that the facility may be utilized in combination with any platform-independent application or service and in other contexts.

A variety of usability data may be desired by an application developer, service provider, or another entity regarding an application or service that is installed on or accessible by a mobile phone or other mobile device. As described above, desired usability data may include how easy the application or service is to use, how often a user makes mistakes, how well the application or service works for its intended purpose, and other data. In the case of T9 software, a developer may be interested in the effectiveness of the order in which matching words are presented, the number of times a user presses a delete key, which application features are discovered by a user, the frequency with which a user uses T9 text entry (e.g., as opposed to traditional "multi-tap" text entry), and other data. Each of the data items in which a developer is interested may be referred to as an "instrumentation point." The usability data may be used by the application developer, service provider, or other entity to improve the performance of the associated application. In some uses, different versions of an application may be released (e.g., versions A, B, and C), and the usability data used to determine which is the best-performing version.

Figure 2:
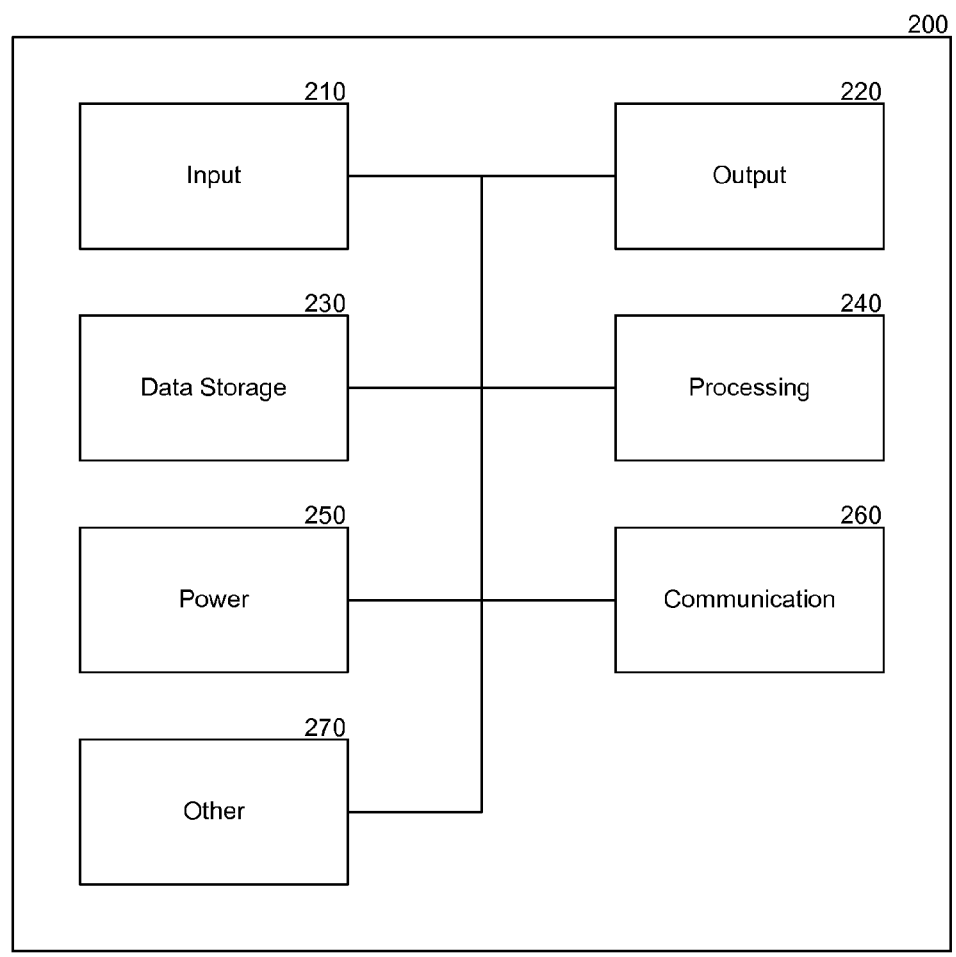
FIG. 2 is a block diagram of components of a mobile phone or other mobile device.

FIG. 2 is a block diagram illustrating representative components of a mobile phone or other mobile device. Mobile device 200 may include an input component 210 and an output component 220. Input component 210 receives user input from one or more input controls, such as device keys, buttons, scroll wheels, touchpads, and so on. Output component 220 provides output to a user, and may include a speaker, a display module, and so on. Mobile device 200 also includes a data storage component 230. Data storage component 230 may be a magnetic media drive, optical media drive, other non-volatile memory, flash memory, and so on, capable of storing operational software, applications, usability data, and other data. The mobile device 200 may also include a processing component 240 for implementing various software processes, a power component 250 that supplies power to the device and the components of the device, and a communication component 260 that communicates with other devices and networks, such as via a wireless network. Mobile device 200 may also include other components 270 not specifically described herein.

Figure 3:
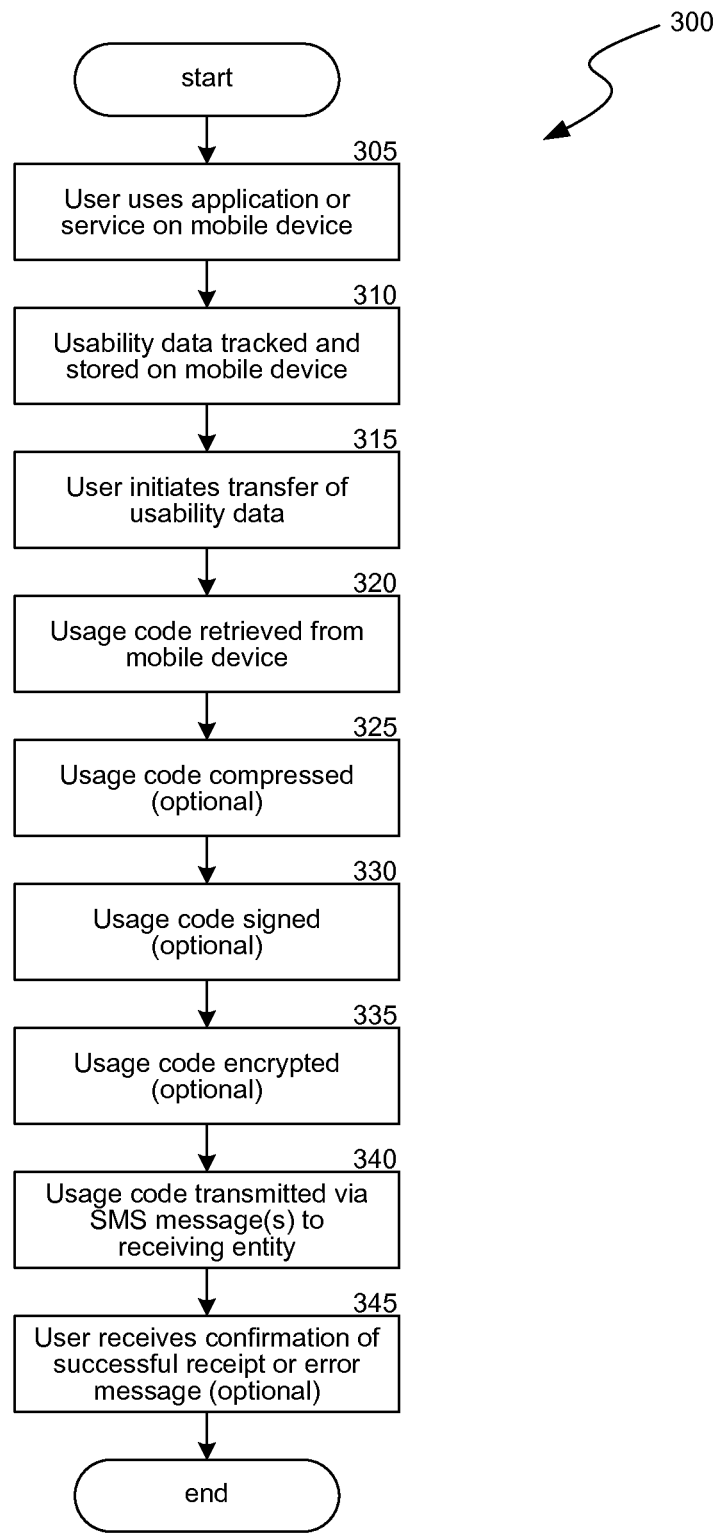
FIG. 3 is a flow diagram of a process by which usability data is transmitted to a receiving entity.

FIG. 3 depicts a representative process by which the facility transfers usability data to an application developer, service provider, or another entity. Beginning at a step 305, the user uses an application or service on the mobile device for which usability data is to be gathered. In some embodiments, the user of a mobile phone or other mobile device is aware that he or she is participating in a usability test and voluntarily agrees to such participation. In other embodiments, a mobile phone continuously collects usability data without the user's knowledge, but ultimately delivers the usability data with the user's informed consent. A usability test may involve using a software application or service for a period of time and, periodically or upon expiration of the time period, providing feedback to the application developer, service provider, or another entity. Feedback may be provided in the form of answering questions, providing comments, transferring data associated with device use, or in a combination of these and other ways. A usability test may also merely involve the passive monitoring of a user's use of an application, including recording the type of interaction with the application and features that are utilized by the user.

In a step 310, usability data is tracked and stored on the user's mobile phone or other mobile device, such as in a data storage component 230 depicted in FIG. 2. The mobile device may track and store the user's activity with regard to each of the instrumentation points defined by the developer, in addition to other information. The usability data that is stored is determined by an application developer, service provider, or other entity associated with the application installed on a mobile device. In some embodiments, the usability data is stored in the aggregate. Alternatively or additionally, the usability data may be stored in a manner that is segregated according to one or more features, including time period, instrumentation point, or other feature.

In a step 315, the user initiates the transfer of usability data to an application developer, service provider, or another entity. A user may initiate transfer of usability data to the receiving entity in a variety of ways. The user may manually enter an initiation code into a device input window, the user may hit "reply" to a received SMS message requesting the usability data, the user may select an option from an application or service menu, the user may input a reserved "Easter egg" key sequence, or the user may initiate transfer of the usability data in a combination of these and other ways. In some embodiments, the user manually enters an initiation code into a device input window. A user may obtain the initiation code in a variety of ways, including from an advertisement (e.g., magazine, television, Internet, etc.); from an application developer, service provider, or another entity; or in another manner. In some embodiments, the initiation code is a short string composed of five or six alphanumeric characters. The facility may require the initiation code to be alphanumeric, both so that the code can be entered by a user and so that the code is compatible with the application or service, such as T9 software. In other embodiments, the user initiates the transfer of usability data by hitting "reply" to a received SMS message that requests the usability data. For example, an application developer, service provider, or another entity may periodically request the transfer of usability data from a user. In other embodiments, the user initiates the transfer of usability data by selecting an option (e.g., "Get Code") from an application or service menu. In other embodiments, the user initiates the transfer of usability data by inputting a sequence of key presses reserved for such purpose (i.e., an "Easter egg" key sequence). In other embodiments, the user may initiate transfer of the usability data by a combination of these and other methods, including voice, electronic, and other delivery methods.

In some of the embodiments in which a user manually enters an initiation code to initiate transfer of usability data, the facility requires the user to have the application or service for which usability data is to be transferred enabled when the user enters the initiation code, so that the initiation code can be intercepted by the application or service. For example, the facility may require that the T9 text entry mode be enabled when the user enters the initiation code.

In some of the embodiments in which a user manually enters an initiation code to initiate transfer of usability data, the same initiation code is entered by all users. That is, a single code is a common point of entry for all device users, regardless of device model, version of the application or service, location, or other parameter. In other embodiments, a variety of initiation codes are used to initiate the transfer of usability data, each code used by a subset of users. Each code may be used to target a certain group of users. For example, a first initiation code may be provided to music fans (e.g., in an advertisement in Rolling Stone magazine), a second initiation code may be provided to parents of young children (e.g., in a commercial during a children's television show), and a third initiation code may be targeted toward a protected demographic (e.g., users under the age of 13) so that certain classes of private data may be protected in compliance with applicable laws and regulations. The facility may thus differentiate the usability data associated with each subset of users, since the usability data that the user group returns may be tagged or otherwise associated with the initiation code.

After the user initiates a transfer of usability data at step 315, at a step 320 a usage code is retrieved from the user's mobile phone or other mobile device for transfer to the application developer, service provider, or another entity via one or more SMS messages or other communication channel. The usage code is generated by the facility, and may reflect raw usability data or an aggregated or summarized form of the usability data. In some embodiments, the usage code is an alphanumeric code sequence that represents usability data and other information. For example, a usage code such as "A94B88X1K482" may represent usability data corresponding to "500 uses, 100 cancellations, 90 input timeouts, and 3,000 word misses." An alphanumeric code sequence is utilized because alphanumeric characters are supported by nearly all text encoding formats, and they allow the user to easily transcribe the sequence into the reporting message. As with the initiation code described above, the facility may require the usage code to be alphanumeric so that the code is also compatible with the application, protocol, or service, such as T9 software. The usage code may be divided into segments separated by punctuation or whitespace, such as in groups of four or five characters, to improve readability and/or for other reasons. For example, the usage code above might be divided into segments such as "A94B 88X1 K482" or "A94 B88 X1 K 482." Those skilled in the art will appreciate that a tradeoff is made by the facility operator between the amount and detail of usability data that is collected by the facility, the level of aggregation or summarization of the usability data, and the length of the resulting usage code.

In addition to usability data, a usage code may also include or reflect a variety of other data, including a version number of the application or service from which the usability data is derived, the type of mobile phone or other mobile device on which the application or service is accessed or utilized, an initiation code entered by the user (if any), an indication of the format version of the usage code (e.g., so the code can be properly decoded), and other data. For example, in some embodiments, multiple releases or versions of an application or service are deployed to end users. For instance, an application may have three versions, A, B, and C, each with different features. Each release or version may be deployed to a subset of mobile phones or other mobile devices. Usability data may be gathered on the use of each release or version, allowing an application developer, service provider, or another entity to evaluate, for example, which of the releases or versions is most successful. As another example, in some embodiments, the usage code may be formatted in a variety of ways, depending, for example, on the types of data that may comprise the code. In some embodiments, to properly extract the data represented by the usage code, the receiving entity retrieves the format version indicator (or "schema identifier") from the usage code and uses it to decode the usage code according to the proper format.

In some embodiments, the order of the data contained in a usage code is arranged by priority from most important to least important, such that the most important data is more likely to be recovered or extracted in the event that the entire usage code is not successfully transmitted. For example, a message may be truncated during transmission resulting in the loss of the least significant data. As another example, if decompression is to be performed from left to right on a usage code, the most important data may be placed at the leftmost portion of the usage code. Alternatively or additionally, an important piece (or pieces) of data may be followed by a checksum that is limited to that data piece.

At a step 325, the usage code is optionally compressed. The usage code may be compressed using any of a variety of known compression algorithms. The usage code may be compressed as a whole, or the code may be broken into segments and each segment compressed individually. Within a usage code, individual fields may each use a different compression algorithm that is well-suited to the data characteristics of the field. For example, an instrumentation point that often contains text written in English can be compressed using Huffman code tables, which are optimized for English language patterns. A compression technique may be selected based on the type of data that is expected to comprise the usage code, and the type of segmentation used in the code.

At a step 330, the usage code is optionally signed. The usage code may be signed using any of a variety of known signature techniques. A signature indicates that the code originated at an authentic (e.g., T9) source and verifies that the data is intact (i.e., no data has been added or omitted).

At a step 335, the usage code is optionally encrypted. In some embodiments, the facility contains a store of public keys for the intended recipient of the usage code. The usage data is encrypted with a public key, which renders the message containing the usage code unreadable by any entity other than the intended recipient. For example, it may be desirable to encrypt the usage code when the usage data is not anonymous, i.e., when it contains personally identifiable information associated with the user.

In some embodiments, the usage code includes one or more checksums, i.e., a redundancy check that verifies that data was correctly entered. For example, a checksum may be included at the beginning or end of the entire usage code, after each block of a certain number of characters (e.g., five), or in another manner. Including a checksum for each of a group of a certain number of characters allows each group to be verified independently. Thus, if an entire usage code was not entered correctly, each block of characters that was entered correctly may still be recovered. Inclusion of a checksum (whether one or multiple) may depend on the type of compression algorithm optionally used to compress the usage code, as described above.

At a step 340, the usage code is transmitted from the mobile phone or other mobile device to the receiving entity via one or more SMS messages or other communication channel such as via a WAP browser. The usage code may be displayed to the user and instructions presented to the user of a destination address to which the usage code should be transmitted. The user then transcribes the usage code into an SMS message or other communication message and transmits the usage code. Alternatively, the usage code may be automatically populated into a responsive SMS message or communication message that a user sends. As described above, in some embodiments, the usage code is comprised of alphanumeric characters. While most SMS messages are limited to 160 characters, a series of SMS messages may be transmitted such that the entire message may be more than 160 characters. A message of more than 160 characters is divided into a series of messages, each a maximum of 160 characters. Similarly, a usage code that is more than 160 characters may be divided into a series of SMS messages, each a maximum of 160 characters. An advantage of such a transmission method is that it allows the facility to export data through the transport layer of the mobile device, even if the monitored application cannot normally communicate through the transport layer.

The destination address to which the usage code is transmitted may be determined in a number of ways. If the user is prompted to submit the usability data by an advertisement in a magazine or other media, the destination address may be specified in the form of an SMS shortcode. If the user is prompted to submit the usability data by receiving an SMS message, then the destination address is specified by the reply address of the received message. The facility may also maintain a stored representation of one or more destination addresses, and may present the destination address to the user in conjunction with the presentation of the usage code.

Figure 4:
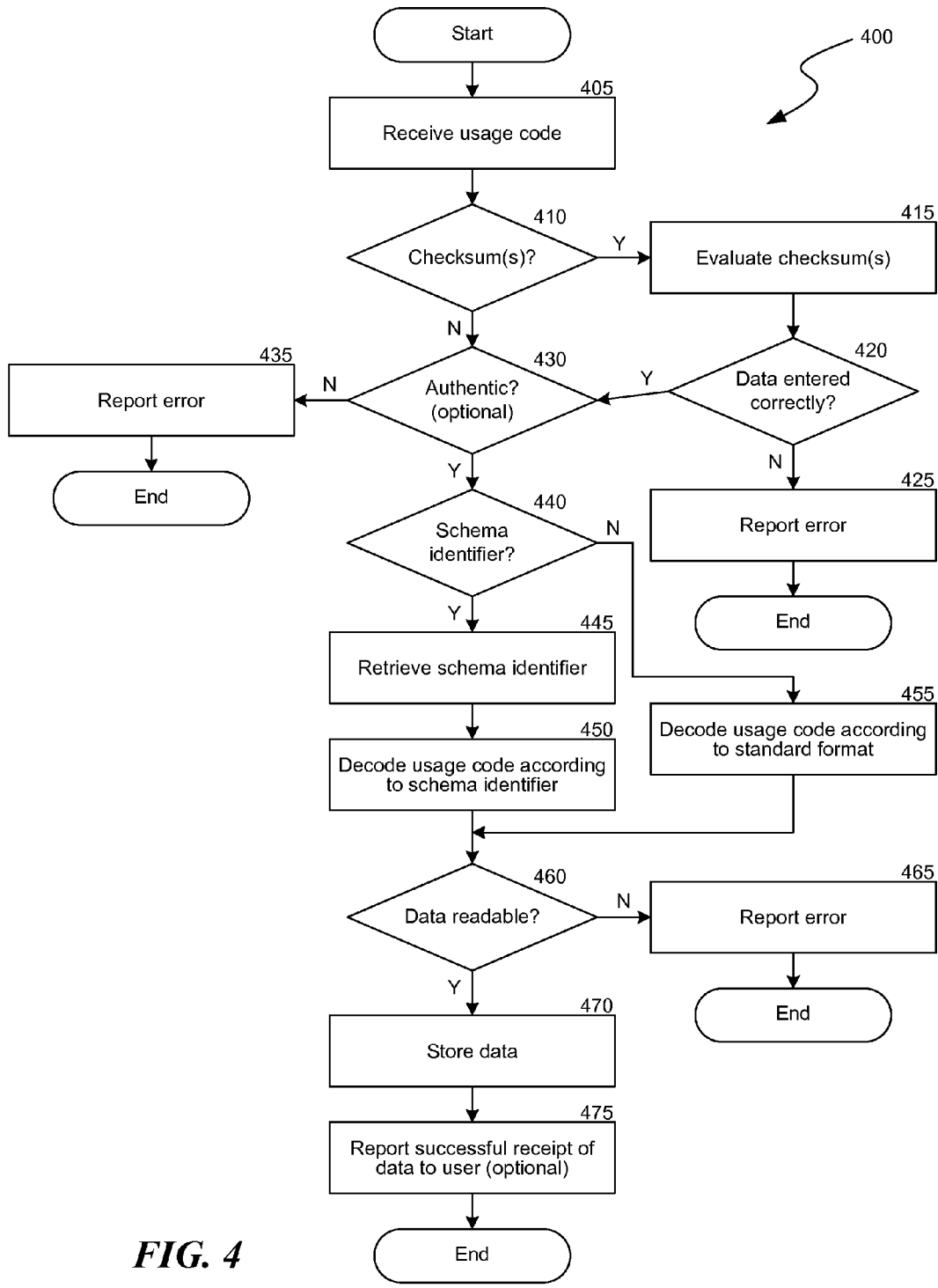
FIG. 4 is a flow diagram of a process by which a receiving entity processes a usage code.

FIG. 4 illustrates how a usage code is processed by a receiving entity in accordance with the facility in some embodiments. At a step 405, the entity receives the usage code from the user. The facility performs one or more operations associated with the usage code to extract the data contained therein. At a decision block 410, the facility determines whether the usage code contains one or more checksums. If the usage code contains checksums, at a block 415, the facility evaluates each of the checksums. At a decision block 420, the facility verifies whether the data was correctly received based on the checksum evaluation. If the data was not received correctly, at a block 425, the facility reports an error. If the data was received correctly, or if at decision block 410 the usage code did not contain a checksum, at a decision block 430 the facility optionally verifies that the usage code is authentic and decrypts the usage code. Authentication may take place according to any one of a variety of known authentication methodologies, including through use of a software application. If the usage code is not authentic, at a block 435 the facility reports an error.

At a decision block 440, the facility determines whether the usage code contains a schema identifier that specifies the format of the data comprising the usage code. As described above, in some embodiments, the usage code may be formatted in a variety of ways. For example, different usage code formats may comprise different instrumentation points or other data, may have a different ordering of data, or may otherwise be formatted differently. If the usage code contains a schema identifier, at a block 445 the facility retrieves the schema identifier from the usage code, and at a block 450 the facility decodes the usage code according to the schema identifier. Each schema identifier may correspond to an instrumentation schema stored at a server of the receiving entity. Due to the size of the instrumentation schema, the use of a common instrumentation schema by many mobile devices, and other considerations, the instrumentation schema may be stored at the server rather than be contained in the usage code obtained from a mobile device. Instead, an indicator of the usage code format is included in the usage code, which references the instrumentation schema stored at the server. If the usage code does not contain a schema identifier (e.g., indicating that the usage code is generated according to an established format), at a block 455, the facility decodes the usage code according to the standard format in which the data is stored.

At a decision block 460, the facility determines whether the decoded data is readable (i.e., usable). If the data is not readable, at a block 465 the facility reports an error. These and other operations may be performed by the receiving entity to extract the data contained in the usage code. The operations may be performed in the order described or the operations may be performed in another order.

At a block 470, the facility stores the usability data extracted from the usage code. In some embodiments, the facility stores usage codes and the data contained therein in one or more databases. The entity may use the stored data to perform various data mining and analysis techniques in order to evaluate how mobile device users utilize the application or service.

At a block 475, the facility optionally reports to the user the successful receipt of the usability data or, if the data was not successfully received, an error message. This corresponds to block 345 in FIG. 3, in which the user optionally receives confirmation of successful receipt of the usability data by the receiving entity or, if the usability data is not successfully received, an error message. If the usage code was not successfully received, the facility may allow the user to retransmit the usage code.

In some embodiments, the usability data stored on a user's mobile phone or other mobile device is reset after a usage code is transmitted by the user. In other words, the usability data maintained by the mobile phone or other mobile device is limited to the data that has accumulated since the last submission of usability data (i.e., "incremental data"). In other embodiments, aggregate usability data is stored on the user's mobile phone or other mobile device. That is, any usability data that is generated following a transmission of a usage code is added to a cumulative measure of usability data stored by the mobile phone or other mobile device. This protects against data loss in the event that a prior transmission of a usage code containing usability data was not successful. Because the facility may operate via unidirectional communication and delivery of an SMS message containing a usage code is not guaranteed, usability data may be lost if the usability data is reset following transmission of a usage code. In some embodiments, both aggregate and incremental usability data are stored by the user's mobile phone or other mobile device. In such embodiments, the usability data accumulated following a transmission of a usage code (i.e., incremental data) may be marked or otherwise indicated as such. The usability data transmitted in a usage code may include both the aggregate and incremental usability data.

In some embodiments, the transmission of usability data by a user may be subsidized, rewarded, or otherwise encouraged by an application developer, service provider, or another entity. Usability data and other information transmitted via an SMS message may be subject to ordinary SMS message charges and/or other fees. In order to encourage users to transmit usability data via an SMS message, an entity may reimburse users for the cost of the SMS message, offer one or more free items (e.g., a ringtone, a graphic, a song, or another piece of digital media or digital item) in exchange for transmission of the message, or may otherwise defray the cost of the message.

In some embodiments, the facility provides application developers, service providers, and other entities with a tool that can be used to generate an instrumentation schema. An application developer, service provider, or another entity may specify the instrumentation points (i.e., usability data points) in which the entity is interested. For example, the entity may specify that it is interested in the number of times a user presses a delete key, whether a particular application feature (e.g., pressing and holding a device key to enter the number associated with the key) is discovered by a user, the ratio of T9 text entry usage to traditional "multi-tap" text entry usage, and other data. The selected instrumentation points may be compiled into the application or service software (e.g., in C code) and deployed on mobile devices to generate usage codes.

In some embodiments, the facility provides application developers, service providers, and other entities with the ability to analyze results and perform data mining using the usage data that is extracted according to the instrumentation schema.

As an alternative to or in addition to the transfer of usability data, the facility may utilize a usage code to transmit survey results or other information. As with usability data, a user may initiate transfer of survey results or other information to an application developer, service provider, or another entity in a variety of ways. The user may manually enter a initiation code, the user may hit "reply" to a received SMS message that requests participation in a survey, the user may select an option from an application or service menu, the user may input a reserved "Easter egg" key sequence, or the user may initiate transfer of the survey results or other information in another manner. Survey results or other information may include answers to questions (e.g., multiple choice or yes/no), comments, and other information. The data may be represented by an alphanumeric code sequence, similar to the usage code described above. In addition, the data may include a checksum and may be prioritized, signed, and/or compressed in a manner similar to that described above. Survey results and other information may be transmitted via one or more SMS messages. A receiving entity, such as an application developer, service provider, or another entity, may process the survey results and other information in a manner similar to that described above.

From the foregoing, it will be appreciated that specific embodiments of the invention have been described herein for purposes of illustration, but that various modifications may be made without deviating from the spirit and scope of the invention. For example, while signaling or blocks are presented in a given order, alternative implementations may perform routines having signaling or blocks in a different order, and some signaling or blocks may be deleted, moved, added, subdivided, combined, and/or modified to provide alternative or subcombinations. Each of the signaling or blocks may be implemented in a variety of different ways. Also, while signaling or blocks are at times shown as being performed in series, the signaling or blocks may instead be performed or implemented in parallel, or may be performed at different times. Accordingly, the invention is not limited except as by the appended claims.

I claim:

1. A computing system for retrieving user activity data from a mobile device, the system comprising:
    a component configured to store user activity data on the mobile device,
        wherein the user activity data represents a record of multiple user interactions with an application or service of the mobile device;
    a component configured to receive from a user of the mobile device an indication to initiate transfer of the stored user activity data to a remote entity;
    a component configured to generate a usage code representing the stored user activity data,
        wherein the usage code contains an identifier that specifies a format of the usage code;
    a component configured to, in response to the received indication to initiate transfer, populate a communication message with the generated usage code; and
    a component configured to transmit the populated communication message from the mobile device to the remote entity via a mobile device communication protocol.

2. The system of claim 1 wherein the user activity data comprises data that can be analyzed to assess usability of the mobile device or of the application or service of the mobile device.

3. The system of claim 1 wherein the application or service is an input method editor and wherein the user interactions comprise text entry on the mobile device.

4. The system of claim 1 wherein the application or service does not have direct access to the network capabilities of the mobile device.

5. The system of claim 1, further comprising an instrumentation schema associated with the application or service of the mobile device, wherein the instrumentation schema specifies the user interactions that are stored or used to generate a usage code.

6. The system of claim 1 wherein the usage code represents raw user activity data or summarized user activity data.

7. The system of claim 1 wherein the received indication to initiate transfer is one of multiple initiation codes, and wherein at least two of the multiple initiation codes are associated with a different subsets of users.

8. The system of claim 1 wherein generating the usage code includes individually compressing a portion of the usage code.

9. The system of claim 1, further comprising a component configured to receive from a user of the mobile device an indication to transmit the populated communication message to the remote entity.

10. A computer-readable memory containing instructions that, when executed by a processor, cause the processor to execute a method for delivering usage data from a portable device to a remote service, comprising:
    receiving from a user of the portable device a command to initiate delivery of usage data to the remote service,
        wherein the usage data is stored on the portable device and represents user interactions with the portable device;
        wherein the usage code contains an identifier that specifies a format of the usage code;
    generating a usage code that represents the stored usage data;
    in response to receiving the command to initiate delivery from the user, inserting the generated usage code into a message; and
    sending the message from the portable device to the remote service using a portable device communication protocol.

11. The computer-readable memory of claim 10 wherein inserting the generated usage code into a message comprises: displaying the extracted usage code to the user via a display of the portable device; and receiving entry by the user of the displayed usage code into the message.

12. The computer-readable memory of claim 10 wherein the usage data is stored separately according to one or more parameters of the usage data, and wherein the parameters include time period or category of user interactions.

13. The computer-readable memory of claim 10 wherein the stored usage data includes both aggregate usage data and incremental usage data, and wherein the aggregate usage data comprises cumulative usage data, and wherein the incremental usage data comprises usage data tracked since a most recent delivery of the message to the remote service.

14. The computer-readable memory of claim 13 wherein usage data accumulated following a delivery of a message to the remote service is marked as incremental usage data.

15. The computer-readable memory of claim 10, further comprising: receiving an error message indicating that the usage code was not successfully received; and resending a message containing the usage code to the remote service.

16. A method for obtaining user activity data from a mobile device, the method comprising:
   receiving a usage code from the mobile device,
      wherein the usage code represents user interactions with the mobile device or an application or service of the mobile device, and
      wherein the usage code is received from the mobile device via a mobile device communication protocol;
   identifying a data format of the received usage code;
      wherein identifying a data format of the received usage code comprises extracting from the received usage code a format identifier, or
      wherein the usage code does not contain a format identifier, and wherein identifying a data format of the received usage code comprises identifying a standard format, and wherein decoding the received usage code comprises decoding the usage code according to the standard format; and
   decoding the received usage code according to the identified data format,
      wherein the decoding includes obtaining from the usage code information associated with the user interactions represented by the usage code.

17. The method of claim 16, further comprising, prior to receiving a usage code from the mobile device, sending a message to the mobile device requesting that the mobile device transmit the usage code.

18. The method of claim 16, further comprising analyzing the obtained information to assess the usability of the mobile device or the application or service of the mobile device.

19. The method of claim 16, further comprising:
   determining whether the usage code was successfully decoded;
   if the usage code was successfully decoded, sending a confirmation message to the mobile device indicating that the usage code was successfully received; and
   if the usage code was not successfully decoded, sending an error message to the mobile device indicating that the usage code was not successfully received.

* * * * *